ically susceptible to degradation, comprising incorporating in said polymer a synergistic combination of stabilizing components as described in the previous paragraph.

United States Patent Office 3,454,521
Patented July 8, 1969

3,454,521
POLY-ALPHA-OLEFINS STABILIZED WITH A SYNERGISTIC COMBINATION
Clarence E. Tholstrup, Kingsport, Tenn., assignor to Eastman Kodak Company, Rochester, N.Y., a corporation of New Jersey
No Drawing. Continuation of application Ser. No. 538,432, Mar. 29, 1966. This application June 14, 1967, Ser. No. 646,118
Int. Cl. C08f 45/62, 45/58
U.S. Cl. 260—45.75
6 Claims

ABSTRACT OF THE DISCLOSURE

Poly-α-monoolefins are stabilized against degradation by weathering, including sunlight, and by heat by the use of a synergistic combination of (1) a zinc dialkyldithiocarbamate, (2) a 2,4,6-trialkylphenol, (3) a 2-hydroxybenzophenone and substituted derivatives thereof having hydroxy, alkoxy, alkyl and carbalkoxy substituents, and (4) one or both of (a) an organic phosphite, and (b) a dialkyl ester of a thiodialkanoic acid.

---

This application is a continuation of application Ser. No. 538,432, now abandoned, filed Mar. 29, 1966, which in turn is a continuation of application 246,371, filed Dec. 21, 1962, and now abandoned, which is a continuation-in-part with respect to some of the subject matter set forth in applicant's copending application Ser. Nos. 159,771, now abandoned, and 159,784, now Patent No. 3,249,583, issued May 3, 1966, both of which were filed on Dec. 15, 1961.

This application is a continuation-in-part of copending application Ser. No. 159,784 filed Dec. 15, 1961. Related subject matter is also disclosed in applicants' copending application Ser. No. 159,771 filed Dec. 15, 1961.

This invention relates to the process and product resulting from the stabilization of solid α-olefin polymers utilizing a synergistic combination of a (1) a zinc dialkyldithiocarbamate, (2) a phenolic antioxidant, and (3) an ultraviolet inhibitor. This invention also encompasses further improvement achieved by a fourth component: (4A) an organic phosphite or (4B) a diester of a thiodifatty acid, or both (4A) and (4B) present together.

While this invention pertains primarily to solid polymers of α-olefins, it also relates to similar results with respect to other polymeric substances as mentioned hereinafter. A polymer which presents especially troublesome problems with respect to its stabilization is polypropylene such as can be made by a polymerization process using a partially reduced, heavy transition metal compound as explained in U.S. Patent No. 2,965,606 or U.S. 2,985,617. Thus, the stabilizer combination of this invention is effective in polypropylene containing small amounts of reduced catalyst residues, e.g. (1) reacting aluminum triethyl with TiCl₃, (2) reacting ethyl aluminum sesquichloride with TiCl₃ and hexamethylene phosphortriamide, (3) reacting lithium aluminum hydride with TiCl₃ et cetera. Such polyproplene compositions usually contain at least 0.001 percent ash upon analysis. The present invention is quite effective for such polypropylenes that contain 0.02 percent ash or even more, e.g. 0.2 percent ash. Similar considerations apply with respect to polyethylene although its inherent stability as manufactured is much greater than that of polypropylene. The problems associated with the manufacture of stable polypropylene are also relevant to the manufacture of other polymers derived from α-olefins containing from 2–12 carbon atoms.

It is an object of this invention to provide a composition of matter comprising a solid α-olefin polymer normally subject to degradation containing a synergistic combination of stabilizing components.

It is a further object of this invention to provide an improved process for the stabilization against oxidative and thermal degradation of solid polymers of α-olefins normally susceptible to degradation, which process includes the step of incorporating in the polymer a synergistic combination of stabilizing components.

It is an additional object of this invention to provide a synergistic combination of stabilizing components for use in various polymers comprising (1) a zinc dialkyldithiocarbamate, (2) a phenolic antioxidant, and (3) ultra-violet inhibitor.

It is a further object of this invention to provide even more effective synergistic combinations of stabilizing components comprising (1) a zinc dialkyldithiocarbamate, (2) phenolic antioxidant, (3) ultraviolet inhibitor, and either (4A) an organic phosphite or (4B) a diester of a thiofatty acid, or both component (4A) and component (4B) present together, in which latter case an especially unobvious improvement is achieved.

Other objects are apparent elsewhere herein.

According to a preferred embodiment of this invention, there is provided a composition of matter comprising a solid α-olefin polymer normally susceptible to degradation, admixed with a synergistic combination of the following stabilizing components:

(1) a zinc dialkyldithiocarbamate wherein each alkyl radical contains from 3 to 20 carbon atoms, (2) at least one phenolic component selected from the group consisting of (a) a 2,4,6-trialkylphenol wherein each alkyl radical contains from 1 to 24 carbon atoms, (b) an alkylidenebis(alkylated phenol) wherein each alkyl radical contains from 1 to 24 carbon atoms and (c) at least one thiobis(alkylated phenol) wherein each alkyl radical contains from 1 to 24 carbon atoms, and (3) at least one ultraviolet light inhibiting component selected from the group consisting of (a) a phenylsalicylate having from 13 to 60 carbon atoms and (b) a 2-hydroxybenzophenone having from 13 to 60 carbon atoms each of said components being utilized in an amount of from about 0.01 to about 5.0 weight percent based on the polymer with an upper limit such that the sum of all such percentages of said components does not exceed 10%.

According to another and especially preferred embodiment of this invention, there is provided a composition of matter as just described wherein a fourth stabilizing component is incorporated as follows:

(4) at least one member selected from the group consisting of (a)_ an organic phosphite containing from 3 to 72 carbon atoms and (b) a dialkyl ester of a thiofatty acid, said ester having from 14 to 56 carbon atoms.

According to another embodiment this invention provides, in a method of stabilizing against oxidative and thermal degradation an α-olefin solid polymer normally susceptible to degradation, the improvement which comprises incorporating in the polymer a synergistic combination of stabilizing components as described above.

According to another especially preferred embodiment of this invention, there is provided the process and the product resulting from the stabilization of a solid low pressure polypropylene polymer containing in excess of about 0.001% by weight of catalyst residues. Such catalyst residues may be present as a consequence of a polymerization process employing a partially reduced heavy transition metal compound catalyst. The low pressure process for preparing such polymers is well known in the art as explained in Belgian Patent 538,782 or in the Scientific Americal, September 1957, pages 98 et. seq., as well as elsewhere. The catalyst systems as illustrated hereinabove and in the prior art include insoluble reaction products, such as described in the copending applications filed by the present applicant on Dec. 15, 1961 which are mentioned above.

The stabilized poly-α-olefin produced in accordance with this invention can be prepared by dissolving the additive components in a suitable solvent and coating particles of the polymer with this solution followed by drying so as to remove the solvent. These particles are useful for the manufacture of shaped objects such as fibers, films, rods, tubes, molded objects, et cetera.

Another method for preparing the stabilized poly-α-olefin comprises mixing the additives into the polymer on hot mill rolls. The milled polymer can then be extruded into a shaped object such as fibers or film or other molded objects. On the other hand, the milled polymers can be granulated and used for injection molding.

Other methods for incorporating the additives (stabilizing components) into various polymers are also self-evident to those skilled in the art.

The amounts of various additives components which can be employed depends upon the degree of stability desired, the amount of deleterious residues in the polymer to be stabilized, etc. It is considered that 5 percent by weight (sum on all stabilizing components) would be the maximum probably required for preventing degradation of polypropylene under severe conditions. In some instances, as little as 0.01 percent of each additive will be adequate to prevent oxidative and thermal degradation. Generally, any one of the additives is used in an amount no more than five times the weight of any other additive that may be present. The additives in this discussion are the stabilizing components described hereinabove, of which the fourth component may be optional in some cases as explained herein.

In summary the poly-α-olefin compositions of this invention are comprised of a normally solid poly-α-olefin containing a zinc dialkyldithiocarbamate, a phenolic antioxidant and an ultraviolet light inhibitor. The addition of an organic phosphorus compound provides surprisingly high heat stability as can also be achieved using a dialkyl ester of a thiofatty acid. The amount of each additive can be from 0.01 to 5% by weight with the total additive content being less than 10% and preferably ranging from 0.1% to 5%. The compositions covered by this invention include the following combinations of stabilizing components:

I. (1) zinc dialkyldithiocarbamate+(2) phenolic antioxidant+(3) U.V. inhibitor
II. (1) zinc dialkyldithiocarbamate+(2) phenolic antioxidant+(3) U.V. inhibitor+(4A) organic phosphorus compound
III. (1) zinc dialkyldithiocarbamate+(2) phenolic antioxidant+(3) U.C. inhibitor+(4B) diester of thiodifatty acid
IV. (1) zinc dialkyldithiocarbamate+(2) phenolic antioxidant+(3) U.V. inhibitor+(4A) organic phosphite +(4B) diester of thiodifatty acid The term "poly-α-olefin" referred to herein covers those polymers prepared by (1) polymerizing an α-monoolefin containing 2 to 12 or more carbons, (2) polymerizing a mixture of α-monoolefins containing 2 to 12 carbons, (3) polymerizing an α-monoolefin containing 2 to 12 carbons with a diolefin including isoprene, butadiene, and substituted butadient, and (4) polyerizing an α-monoolefin with acrylates, styrene, etc. These poly-α-olefin compositions can be pigmented with materials including titanium dioxide, silica, clays, carbon blacks, and the various commercial coloring pigments and still exhibit superior heat and weathering properties. Other additives such as lubricants, slip agents, foaming agents, etc. can be used as require with no deleterious effect upon final properties of the poly-α-olefin.

The poly-α-olefins and their copolymers of particular interest in this invention include polyethylene, polypropylene, polybutene-1, poly-4-methylpentene-1, as well as the block and graft-type polymers that can be prepared using one of these $C_2$ to $C_5$ α-monoolefins as the basic constituent. Also within the scope of this invention résumé are the propylene polyallomers containing ethylene, butene-1, isoprene, tetramethylbutadiene, etc. Moreover, this invention is also applicable to other classes of polymers including cellulose esters, polyamides like nylon, polyesters such as Dacron or Kodel polyesters, polyurethanes, synthetic rubber, elastomers, polycarbonates, polymers of formaldehyde, etc.

These components of the poly-α-olefin composition can be illustrated as follows:

Component (1) is a zinc dialkyldithiocarbamate (0.01 to 5%) having the following formula:

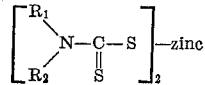

where $R_1$ and $R_2$ are alkyl radicals containing from 1 to 23 or more carbon atoms, preferably 3 to 20 carbon atoms. Examples of these compounds include:

zinc dipropyldithiocarbamate
zinc dibutyldithiocarbamate
zinc butyloctyldithiocarbamate
zinc diamyldithiocarbamate
zinc methylhexyldithiocarbamate
zinc dihexyldithiocarbamate
zinc dinonyldithiocarbamate
zinc distearyldithiocarbamate
zinc didocosanyldithiocarbamate Component (2) is a phenolic antioxidant (0.01 to 5%). Examples of these phenolic compounds include:
(2A) Alkylated phenols:

2,6-di-t-butyl-p-cresol
2,6-didodecyl-p-cresol
2,6-dioctadecyl-p-cresol
2,6-bis(1-methylheptadecyl)-p-cresol
6-dodecyl-2-(1-methylheptadecyl)-p-cresol
2-(1-methylheptadecyl)-6-t-butyl-p-cresol
2,6-bis(1-methylheptadecyl)-p-(hydroxymethyl)phenol
2,6-bis(1-methylheptadecyl)-p-(dimethylaminomethyl) phenol
2,4-dimethyl-6-(1-methylheptadecyl)phenol
2,4,6-tris(1-methylheptadecyl)phenol
2-t-butyl-6-(1-methylcyclohexyl)-p-cresol
2,6-dialkyl($C_6$–$C_7$)-p-cresol
2,6-dialkyl($C_7$–$C_9$)-p-cresol
2,6-dialkyl($C_9$–$C_{11}$)-p-cresol
2,6-dialkyl($C_{11}$–$C_{15}$)-p-cresol
2,6-dialkyl($C_{15}$–$C_{20}$)-p-cresol
2,6-dialkyl($C_{20}$–$C_{24}$)-p-cresol
2,4-dialkyl($C_{15}$–$C_{20}$)-o-cresol The preceding alkylated phenols may be prepared by reacting p-cresol or substituted p-cresol with the appropriate α-olefin. A mixed alkylated phenol such as 2,6-dialkyl($C_{15}$–$C_{20}$)-p-cresol may be prepared similarly to the procedure for a substantially pure alkylated phenol such as 2,6-bis(1-methylheptadecyl)-p-cresol except that a mixed α-olefin, in this instance one containing 15 to 20 carbons, is used.

(2B) Alkylidenebisphenols:

4,4'-butylidenebis(6-t-butyl-m-cresol)
4,4'-butylidenebis(6-nonyl-m-cresol)
4,4'-butylidenebis[6-(1-methylheptadecyl)-m-cresol]
4,4'-methylenebis(6-t-butyl-m-cresol)
2,2'-methylenebis(6-t-butyl-p-cresol)
Reaction product of 3-methyl-6-t-butylphenol and crotonaldehyde (known in the trade as Topanol CA)

(2C) Thiobisphenols:

4,4'-thiobis(6-t-butyl-m-cresol)
4,4'-thiobis(6-nonyl-m-cresol)
2,2'-thiobis(6-t-butyl-p-cresol)

Component (3) is an ultraviolet light inhibitor (0.01 to 5%). Examples of these components include:

(3A) Phenylsalicylates having the general formula:

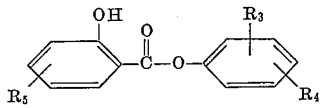

where $R_3$, $R_4$, and $R_5$ are selected from hydrogen atoms, alkyl radicals having from 1 to 24 carbon atoms and aryl radicals of the benzene series having from 6 to 9 carbon atoms. Examples of these phenylsalicylates include:

phenylsalicylate
p-t-butylphenylsalicylate
n-octylphenylsalicylate
(2,2-dimethylhexyl)phenylsalicylate
octadecylphenylsalicylate
dodecylphenylsalicylate
t-octylphenyl-5-t-butylsalicylate
t-octylphenyl-5-dodecylsalicylate
octadecylphenyl-5-octadecylsalicylate
o,o'-dimethylphenylsalicylate
o,o'-dimethylphenyl-5-t-butylsalicylate
o,p-dimethylphenyl-5-t-butylsalicylate
o,o'-dimethylphenyl-5-octadecylsalicylate (3B) 2-hydroxybenzophenones having the general formula:

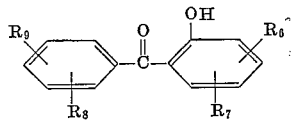

where $R_6$, $R_7$, $R_8$, and $R_9$ are selected from hydrogen atoms, alkyl radicals, alkyloxy radicals, and acyloxy radicals, which radicals have variations of from 1 to 24 carbon atoms.
Examples of these 2-hydroxybenzophenones include:

2-hydroxybenzophenone
2,4-dihydroxybenzophenone
2,2'-dihydroxybenzophenone
4-octyl-2-hydroxybenzophenone
4'-octyl-2-hydroxybenzophenone
4-octyloxy-2-hydroxybenzophenone
4-dodecyl-2-hydroxybenzophenone
4-methoxy-2-hydroxybenzophenone
4-dodecyloxy-2-hydroxybenzophenone
4-octadecyloxy-2-hydroxybenzophenone
4-dodecyloxy-2,2'-dihydroxybenzophenone
4,4'-dimethyloxy-2-hydroxybenzophenone
4,4'-dimethoxy-2,2'-dihydroxybenzophenone
4,4'-didodecyloxy-2-hydroxybenzophenone
4,4'-didodecyloxy-2,2'-dihydroxybenzophenone
2,4,4'-trihydroxybenzophenone 4,4'-distearate
4-phenylcarbonyl-3-hydroxyphenyl stearate
4-phenylcarbonyl-3-hydroxyphenyl laurate Component (4) is optional as regards one embodiment of the invention and when present includes either or both of 4A and 4B as follows:

(4A) Organic phosphorus compound (0 to 5%). Phosphites are preferred and can be selected from one of the two types:

(1) Tris(alkylated phenyl)phosphite:

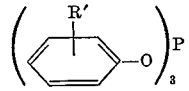

where R' is an alkyl radical having from 1 to 24 carbon atoms.
Examples of these phosphites include:

tris(butylphenyl)phosphite
tris(nonylphenyl)phosphite
tris(dodecylphenyl)phosphite
tris(octadecylphenyl)phosphite (2) Dialkyl pentaerythritol diphosphite:

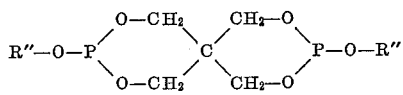

where R'' is an alkyl radical having from 4 to more than 24 carbon atoms. The preferred range is from 10 to 24 carbons in each R'' group. Examples of these phosphites are:

didecyl pentaerythritol diphosphite
didodecyl pentaerythritol diphosphite
distearyl pentaerythritol diphosphite
didocosanyl pentaerythritol diphosphite Certain organic phosphorus compounds useful according to my invention are described in U.S. Patents 3,039,993; 3,047,608; 2,847,443; 3,053,878 and 2,961,454.

(4B) Dialkyl esters of a thiofatty acid (0 to 5%) having the following general formula:

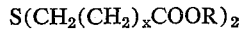

$$S(CH_2(CH_2)_xCOOR)_2$$

where $x$ is an integer of 1 or 2 and where R is an alkyl radical having from 4 to more than 24 carbons, with the preferred range being 10 to 24 carbons. Examples of these compounds include:

dibutyl 3,3'-thiodipropionate
didecyl 3,3'-thiodipropionate
dilauryl 3,3'-thiodipropionate
distearyl 3,3'-thiodipropionate
didocosanyl 3,3'-thiodipropionate
didecyl 4,4'-thiodibutyrate
dilauryl 4,4'-thiodibutyrate
distearyl 4,4'-thiodibutyrate
didocosanyl 4,4'-thiodibutyrate Using polyethylene, polypropylene and a copolymer of propylene and butene-1, as representatives of the various poly-α-olefins within the scope of this invention, various stabilizer combinations can be evaluated. From these data presented herein it is readily seen that the stabilizer combinations of this invention impart excellent weathering properties to the poly-α-olefins as well as excellent heat stability.

For these experiments the stabilizers were blended into the respective poly-α-olefin using a mixer having a 270 g. capacity. The mixing time was 6 min. with the temperature reaching 260 to 280° F. during the blending cycle. The mixed material was then sheeted out in a large 18" x 18" 70-ton press and then granulated when cool. The granulated material was then pressed into films, extruded into 1/16" thick 2⅝" x ½" ASTM tensile bars with a ¼" x 1" narrow center section or extruded into fibers. For fiber testing usually 4 to 6 mixes were prepared and dry-blended as granules to produce 2 to 4 lb. of each composition.

This invention can be further illustrated by the following examples of preferred embodiments thereof although it will be understood that these examples are included merely for purposes of illustration and are not intended to limit the scope of the invention unless otherwise specifically indicated:

Example 1

The weatherability of polyethylene film samples, 1" x 2" and 2-mil thick, containing the stabilizers described above was determined. The results of these tests are shown in Table 1. The film samples were weathered outdoors and in a Twin-Arc Weather-Ometer, Type DLTS, modified with ten 20–W Sun lamps situated 1.5 in. from the position of the sample. The films were exposed at a black-panel temperature of 150° F., an air temperature of 112° F., and a relative humidity of 50%. The films were evaluated by elongation measurements at various intervals of exposure. The percentage of initial elongation remaining after 10 months' outdoor exposure and 1000 hr. in Weather-Ometer are reported in Table 1.

Example 2

The granulated stabilized polypropylene, base resin having an I.V. of 1.1 (at 145° C. in tetralin), was extruded into 12 denier multifilaments by spinning at about 250° C. and then drafting about 4 to 1. However the other spinning temperatures and drafting ratios can be used without adversely limiting the usefulness or effectiveness of the stabilizers described herein. The skeins of the polypropylene multifilaments (several yards of the fiber wound onto a 6-inch long stainless steel frame) were aged in an Atlas Weather-Ometer (dry) and at intervals samples were removed from a skein for physical property measurements using an Instron tester. The percent of original property retained at break was calculated from the T g./den. (tenacity in grame/denier). The results of these data are presented in Table 2. These data show the exceptional weatherability for polypropylene multifilaments containing stabilizers of this invention.

Example 3

Monofilaments, 500 denier, of stabilized polypropylene, base resin having an I.V. of 1.4 (at 145° C. in tetralin), were prepared in manner similar to that used for multifilaments. The monofilaments were woven into ½-in. wide flat braids for weathering in a Weather-Ometer (dry) for intervals of 300, 600, and 1000 hr. These samples were tested for strength (T) and percent elongation (percent E) by breaking the whole braid on the Instron tester and calculating percent of original property retained. The results of these tests, reported as toughness (T x E), are presented in Table 3.

Example 4

Skeins of stabilized copolymer (90% propene-1 and 10% butene-1) as 12 denier multifilaments were evaluated. These fibers were obtained and tested in a manner similar to that described in Example 2. The results of these tests are reported in Table 4.

Example 5

The heat stability data of a polypropylene containing the stabilizers of this invention are presented in Table 5. These data show improved heat stability for the stabilizer combinations disclosed by this invention.

TABLE 1.—STABILITY PROPERTIES OF POLYETHYLENE FILM

| Additives | Percent of initial elongation retained after— | |
|---|---|---|
| | 1,000 hr. in Weather-Ometer | 10 mo. outdoors |
| (1) Unstabilized | 8 | 10 |
| (2) 0.5% DHBP | 60 | 65 |
| (3) 0.05% BZ+0.05% SP | 15 | 20 |
| (4) 0.05% BZ+0.05% BMHPC | 17 | 18 |
| (5) 0.5% DHBP+0.05% BZ+0.05% SP | 98 | 104 |
| (6) 0.5% DHBP+0.05% BZ+0.05% BMHPC | 99 | 101 |
| (7) 0.5% OPS+0.05% BZ+0.05% BMHPC | 75 | 80 |
| (8) 0.5% DHBP+0.05% BZ+0.05% BMHPC +0.01% DSPDP | >100 | >100 |
| (9) 0.5% DHBP+0.05% BZ+0.05% BMHPC +0.05% DLTDP | >100 | >100 |

The polyethylene used in the tests set forth in Table 1 had a Melt Index of 7.58 and film thickness of 2 mils.

The additives used in Tables 1–5 are identified as follows:

DSPDP—distearyl pentaerythritol diphosphite
DDPC—2,6-diodecyl-p-cresol
BMHPC—2,6-bis(1-methylheptadecyl)-p-cresol
SP—4,4'-butylidenebis(6-t-butyl-m-cresol)
SR—4,4'-thiobis(6-t-butyl-m-cresol)
BZ—zinc dibutyldithiocarbamate
NZ—zinc dinonyldithiocarbamate
DHBP—4-dodecyloxy-2-hydroxybenzophenone
OHBP—4-octyloxy-2-hydroxybenzophenone
DH$_2$BP—4-dodecyloxy-2,2'-dihydroxybenzophenone
OPS—p-t-octylphenylsalicylate
OPBS—p-t-octylphenyl-5-t-butylsalicylate
TNPP—tris nonylphenyl phosphite
DLTDP—dilauryl 3,3'-thiodipropionate
DLTDB—dilauryl 4,4'-thiodibutyrate.

TABLE 2.—STABILITY PROPERTIES OF POLYPROPYLENE MULTIFILAMENTS

| Additives | Titanium dioxide, Percent | Percent original property retained after aging skeins of yarn in an Atlas Weather-Ometer (dry) (percent tenacity) | | | |
|---|---|---|---|---|---|
| | | 14 | 260 | 355 hr. | 473 hr. |
| (1) 1% DHBP | 0 | Failed | | | |
| (1A) 1% DHBP | 2.0 | Failed | | | |
| (2) 1% DHBP+0.25% BZ | 0 | Failed 10 | Failed | | |
| (2A) 1% DHBP+0.25% BZ | 2.0 | Failed 4 | Failed | | |
| (3) 1% DHBP+0.25% SP | 0 | Failed | | | |
| (3A) 1% DHBP+0.25% SP | 2.0 | Failed | | | |
| (4) 0.25% BZ+0.25% SP | 0 | Failed | | | |
| (4A) 0.25% BZ+0.25% SP | 2 | Failed | | | |
| (5) 1% DHBP+0.25% BZ+0.25% SP | 0 | 38 | 18 | 8 | 3 |
| (5A) 1% DHBP+0.25% BZ+0.25% SP | 2 | 23 | 6 | 2 | Failed |
| (6) 1% DHBP+0.25% BZ+0.25% SP+0.5% DSPDP | 0 | 57 | 30 | 21 | 11 |
| (6A) 1% DHBP+0.25% BZ+0.25% SP+0.5% DSPDP | 2 | 35 | 9 | 7 | 2 |
| (6B) 1% DHBP+0.25% BZ+0.25% SP+0.5% TNPP | 2 | 36 | 9 | 8 | 3 |
| (7) 1% DHBP+0.25% BZ+0.25% SP+0.25% DLTDP | 0 | 45 | 25 | 14 | 10 |
| (7A) 1% DHBP+0.25% BZ+0.25% SP+0.25% DLTDP | 2 | 35 | 17 | 10 | 5 |
| (8) 1% DHBP+0.25% BZ+0.25% SP+0.25% DLTDP+0.5% DSPDP | 0 | 66 | 40 | 30 | 23 |
| (8A) 1% DHBP+0.25% BZ+0.25% SP+0.25% DLTDP+0.5% DSPDP | 2 | 60 | 36 | 27 | 17 |
| (9) 1% DHBP+0.25% BZ+0.25% SP+0.25% DLTDB+0.5% DSPDP | 0 | 65 | 41 | 29 | 24 |
| (10) 1% OPS+0.25% BZ+0.25% SP | 2 | 18 | 2 | | |
| (11) 1% OPS+0.25% BZ+0.25% SP+0.5% DSPDP | 2 | 21 | 6 | Failed | |

The polypropylene tested in Table 2 had an I.V. at 145° C. of 1.1.

TABLE 3.—STABILITY PROPERTIES OF POLYPROPYLENE MONOFILAMENTS

| Additives | Titanium dioxide, percent | Percent original toughness retained by a ½-inch flat braid from polypropylene yarn (percent toughness) after— | | |
|---|---|---|---|---|
| | | 300 hr. | 600 hr. | 1,000 hr. |
| (1) 1% DHBP (4-dodecyloxy-2-hydroxybenzophenone) | 0 | 15 | Failed | |
| (1A) 1% DHBP (4-dodecyloxy-2-hydroxybenzophenone) | 1.5 | 10 | Failed | |
| (2) 0.25% BZ (butyl zimate)+0.25% SP | 0 | Failed | | |
| (2A) 0.25% BZ (butyl zimate)+0.25% SP | 1.5 | Failed | | |
| (3) 1% DHBP+0.25% BZ+0.25% SP | 0 | 54 | 41 | 22 |
| (3A) 1% DHBP+0.25% BZ+0.25% SP | 1.5 | 56 | 33 | 20 |
| (4) 1% DHBP+0.25% BZ+0.25% SP+0.5% DSPDP | 0 | 70 | 55 | 39 |
| (4A) 1% DHBP+0.25% BZ+0.25% SP+0.5% DSPDP | 1.5 | 65 | 60 | 40 |
| (5) 1% DHBP+0.25% BZ+0.25% SR | 1.5 | 57 | 36 | 29 |
| (6) 1% DHBP+0.25% BZ+0.25% SR+0.5% DSPDP | 1.5 | 66 | 58 | 42 |
| (7) 1% DHBP+0.5% BZ+0.25% DDPC | 1.5 | 72 | 42 | 44 |
| (8) 1% DHBP+0.5% BZ+0.25% DDPC+0.5% DSPDP | 1.5 | 69 | 56 | 43 |
| (9) 1% DHBP+0.25% BZ+0.25% BMHPC | 1.5 | 75 | 58 | 42 |
| (10) 1% DHBP+0.25% BZ+0.25% BMHPC+0.5% DSPDP | 1.5 | 76 | 59 | 46 |
| (11) 1% DHBP+0.25% NZ+0.25% BMHPC | 1.5 | 79 | 60 | 50 |
| (12) 1% DHBP+0.25% NZ+0.25% BMHPC+0.5% DSPDP | 1.5 | 81 | 64 | 56 |
| (13) 1% OHBP+0.25% BZ+0.25% BMHPC+0.5% DSPDP | 1.5 | 70 | 51 | 39 |
| (14) 1% DH₂BP+0.25% BZ+0.25% BMHPC+0.5% DSPDP | 1.5 | 66 | 49 | 33 |
| (15) 1% OPS+0.5% BZ+0.25% SP+0.5% DSPDP | 1.5 | | 33 | 28 |
| (16) 1% OPBS+0.5% BZ+0.25% SP+0.5% DSPDP | 1.5 | | 37 | 30 |
| (17) 1% OPS+0.5% BZ+0.25% DDPC+0.5% DSPDP | 1.5 | | 47 | 34 |

The polypropylene used in the experiments set forth in Table 3 had an I.V. at 145° C. of 1.7.

TABLE 4.—STABILITY PROPERTIES OF A COPOLYMER OF (PROPYLENE/BUTENE-1) MULTIFILAMENTS

| Additives | Titanium dioxide, percent | Percent original toughness retained after aging skeins of yarn in an Atlas Weather-Ometer (dry) | | | |
|---|---|---|---|---|---|
| | | 140 hr. | 260 hr. | 355 hr. | 473 hr. |
| (1) No additives | | Failed | | | |
| (2) 1% DHBP | 0 | Failed | | | |
| (3) 1% OPS | 0 | Failed | | | |
| (4) 0.25% BZ+0.25% SP+0.5% DSPDP | 0 | Failed | | | |
| (5) 0.25% BZ+0.25% BMHPC+0.5% DSPDP | 0 | Failed | | | |
| (6) 1% DHBP+0.25% BZ+0.25% SP+0.5% DSPDP | 0 | 46 | 31 | 20 | 10 |
| (7) 1% OPS+0.25% BZ+0.25% SP+0.5% DSPDP | 0 | 36 | 23 | 10 | |
| (8) 1% DHBP+0.25% BZ+0.25% BMHPC+0.5% DSPDP | 0 | 52 | 43 | 31 | 2 |
| (9) 1% DHBP+0.25% BZ+0.25% BMHPC+0.5% DSPDP | 1.5 | 49 | 35 | 24 | 1 |
| (10) 1% OPS+0.25% BZ+0.25% BMHPC+0.5% DSPDP | 0 | 33 | 26 | 15 | |

The copolymer of 90% propylene and 10% butene-1 used in Table 4 had an I.V. at 145° C. of 2.2 and density of 0.90.

TABLE 5.—HEAT STABILITY OF STABILIZED POLYPROPYLENE

| Additive | Titanium dioxide, percent | Heat stability in hr., 160° C. oven life |
|---|---|---|
| (1) 0.25% BZ+0.25% BMHPC+1% DHBP+0.5% DSPDP | 1.5 | 360 |
| (2) 0.25% BZ+0.25% BMHPC+0.25% DLTDP+1% DHBP | 1.5 | 475 |
| (3) 0.25% BZ+0.25% BMHPC+0.25% DLTDP+0.5% DSPDP+1% DHBP | 1.5 | 575 |

The polypropylene tested in Table 5 had an I.V. at 145° C. of 1.96 and melt flow at 230° C./2.16 kg.=6.5; the samples used were 0.0625 inch thick molded specimens.

An additional example of a four component system which includes two additives in the fourth component is as follows:

Component (1) is zinc dibutyldithiocarbamate,
Component (2) is 2,6-bis(1-methylheptadecyl)-p-cresol,
Component (3) is 4-dodecyloxy-2-hydroxybenzophenone,
Component (4) is dilauryl 3,3'-thiodipropionate and distearyl pentaerythritol diphosphite.

Although the invention has been described in considerable detail with reference to certain preferred embodiments thereof, it will be understood that variations and modifications can be effected without departing from the spirit and scope of the invention as described hereinabove and as defined in the appended claims.

I claim:
1. A composition comprising a solid mono-α-olefin polymer normally susceptible to degradation and a stabilizing amount of a synergistic combination of the following stabilizer components:

(A) zinc dibutyldithiocarbamate,
(B) 2,6-bis(1-methylheptadecyl)-p-cresol,
(C) 4-dodecyloxy-2-hydroxybenzophenone, and
(D) at least one of distearyl pentaerythritol diphosphite, dilauryl-3,3'-thiodipropionate, or tris(nonylphenyl) phosphite.

2. A composition according to claim 1 wherein (D) is distearyl pentaerythritol diphosphite.

3. A composition according to claim 1 wherein (D) is dilauryl-3,3'-thiodipropionate.

4. A composition according to claim 1 wherein (D) is distearyl pentaerythritol diphosphite and dilaury-3,3'-thiodipropionate.

5. A composition according to claim 1 wherein said mono-α-olefin polymer is polypropylene.

6. A shaped article of the composition of claim 1.

References Cited

UNITED STATES PATENTS

| 2,972,596 | 2/1961 | Newland et al. | 260—45.85 |
| 2,972,597 | 2/1961 | Newland et al. | 260—45.85 |
| 2,980,645 | 4/1961 | Newland et al. | 260—45.75 |
| 3,039,993 | 6/1962 | Friedman | 260—45.8 |
| 3,144,422 | 8/1964 | Homberg | 260—45.85 |

FOREIGN PATENTS

| 1,245,606 | 10/1960 | France. |
| 1,248,217 | 10/1960 | France. |

DONALD E. CZAJA, Primary Examiner.

H. E. TAYLOR, JR., Assistant Examiner.

U.S. Cl. X.R.

260—23, 41, 45.7, 45.85, 45.95